(12) United States Patent
Czadul et al.

(10) Patent No.: US 6,618,169 B2
(45) Date of Patent: Sep. 9, 2003

(54) PRINT DATA ADAPTATION MEANS FOR A THERMAL PRINTER

(75) Inventors: Walter Czadul, Hartberg (AT); Martin Loidl, Pölten (AT); Karl Hanisch, Vienna (AT)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/734,774

(22) Filed: Dec. 12, 2000

(65) Prior Publication Data

US 2001/0005215 A1 Jun. 28, 2001

(30) Foreign Application Priority Data

Dec. 15, 1999 (EP) ............................................. 99890388

(51) Int. Cl.$^7$ ............................................. G06K 15/00
(52) U.S. Cl. ......................................... 358/1.2; 358/1.9
(58) Field of Search ........................... 358/1.2, 1.9, 3.12, 358/503, 501

(56) References Cited

U.S. PATENT DOCUMENTS 6,340,983 B1 * 1/2002 Hamada ...................... 347/131

FOREIGN PATENT DOCUMENTS

| DE | 0212199 A1 * | 7/1986 | ............ H04N/1/00 |
| EP | 0554002 A2 | 8/1993 | ............ H04N/1/40 |
| EP | 0655854 A1 | 5/1995 | ............ H04N/1/00 |

* cited by examiner

Primary Examiner—Jerome Grant, II
(74) Attorney, Agent, or Firm—Quarles & Brady LLP (57) ABSTRACT

Print data adaptation means (67) include data conversion means (37) which are adapted to convert the received scan data (SD1) into printable print data (PD2) in accordance with first conversion information (CI1), which print data (PD2) can be printed by thermal printing means (44) set to a first print mode, and which conversion means (37) are adapted to convert received scan data (SD1) into printable print data (PD2) in accordance with second conversion information (CI2), which print data (PD2) can be printed by the thermal printing means (44) set to a second print mode, the printing row feed (RD1) of the thermal printing means (44) in the first print mode of the thermal printing means (44) corresponding substantially to the printing dot size (DP) and the printing row feed of the thermal printing means (44) in the second print mode of the thermal printing means (44) being smaller than the printing dot size (DP).

16 Claims, 3 Drawing Sheets

PRINT DATA ADAPTATION MEANS FOR A THERMAL PRINTER

BACKGROUND OF THE INVENTION

A print data adaptation apparatus, such as a scanning device, such as a thermal printing device, such as a copying device and such as a facsimile device are known, namely from a facsimile apparatus which is commercially available from the Applicant under the type designation "Magic Vox" and which is a multi-purpose apparatus having a copy mode as well as other modes. In the copy mode of the multi-purpose apparatus the contents of a document can be copied onto a printable medium.

In the copy mode a scanner of the scanning device is activated, which scanner is adapted to scan the contents of the document in a dot-by-dot fashion and to generate and supply scan data in accordance with the contents of the document. The scanner has a scanning head having 1728 optical sensors. Each sensors has a scanning dot size of 0.125 mm corresponding to a diameter of the sensor. The sensors are arranged in rows, thus enabling the contents of a document to be scanned by means of the scanner in a dot-by-dot fashion along a row. Furthermore, in the copy mode a document feed roller forming part of document feed means is active and causes the document to be advanced stepwise by a scanning row feed which essentially corresponds to the scanning dot size. This makes it possible to scan the contents of the document in a dot-by-dot fashion along successive rows. On the basis of the construction of the scanning head and the construction of the document feed means a resolution in the feed direction of the document, i.e. a so-called vertical scan resolution, of 200 dpi and a resolution in a direction perpendicular to the feed direction of the document, i.e. a so-called horizontal scan resolution, of 200 dpi can be achieved during scanning. The scan data generated during scanning form a digital representation of brightness values of the document contents, the brightness values being quantified in 256 brightness levels.

Moreover, print data adaptation means are active in the copy mode of the multi-purpose apparatus. The scan data generated by the scanner are applied to the print data adaptation means via receiving means. Subsequently, the scan data are preprocessed in the receiving means so as to quantify the brightness values in 128 brightness levels. In the data conversion means the scan data are converted into print data which are printable by a thermal printer in accordance with first conversion information based on a conversion table. During the conversion the 128 brightness levels are converted into 64 gray tones, the digital representations of said gray tones forming the print data. The print data can be supplied via output means.

Moreover, a thermal printer of the thermal printing device is active in the copy mode of the facsimile apparatus, which printer is adapted to print print data onto a printing medium and which in the known multi-purpose apparatus effects printing on a printing medium with the aid of a thermal transfer printing process. For this purpose, the print data generated by the print data adaptation means are applied to the thermal printer. The thermal printer has a print head equipped with 1728 heating elements. Each heating element has a printing dot size of 0.125 mm, which corresponds to a diameter of the heating element. The heating elements are arranged in a row, as a result of which the thermal printer can print the contents of the document in a dot-by-dot fashion along one row on the printing medium. During a printing operation the printing medium is in close contact with a thermal transfer foil, as a result of which during heating of a heating element a heat-activated dye carried in the thermal transfer foil is transferred to the printing medium in a dot-by-dot fashion. This results in a dot-by-dot inking of the printing medium. A printing medium feed roller forming part of the printing medium feed means is also activated in the copy mode and causes a stepwise feed of the printing medium and a synchronous transport of the thermal transfer foil with a printing row feed which substantially corresponds to the printing dot size. On the basis of the construction of the thermal printer and the construction of the printing medium feed means it is possible to achieve a resolution in the feed direction of the printing medium, i.e. a so-called vertical print resolution, of 200 dpi and a resolution in a direction perpendicular to the feed direction of the printing medium, i.e. a so-called horizontal print resolution, of 200 dpi during printing.

In practice, a problem occurs in the known multi-purpose apparatus during copying of a continuous black area on a document, which area is large in comparison with the scanning dot feed and the printing dot feed. This problem is illustrated in the left-hand part of FIG. 2, which shows a detail at a suitably enlarged scale of a typical result E1 obtained when a continuous black area on a document is copied onto a printing medium. A plurality of dot-like black ink portions A1 printed on the printing medium are shown, which lie at the intersections of the printing row lines R1 to R5 with the printing column lines C1 to C5. As compared with one another, the individual ink portions exhibit a typical distinct anisotropy as regards their shapes, as is customary for a thermal printer. Furthermore, a plurality of blank portions B1 between the black ink portions A1 are visible, which blank portions have areas which vary in comparison with one another and which join one another in many cases. The discontinuous area on the copy, which area is formed by the black ink portions A1 and the blank portions B1 and deviates from a continuous black area, exhibits a residual gray tone which differs distinctly from black. The residual gray tone manifests itself in a reduction of a maximal image contrast, which in the present case means a reduction to less than 64 gray tones. This results in a substantially reduced reproducibility of details of the contents copied from a document onto a printing medium.

SUMMARY OF THE INVENTION

It is an object of the invention to solve the aforementioned problems with print data adaptation apparatus, with a scanning device, with a thermal printing device, with a facsimile, to provide an improved print data adaptation apparatus, and an improved scanning device, and an improved thermal printing device, and an improved copying device, and an improved facsimile device.

In print data adaptation apparatus this object is achieved in an advantageous manner such that the scan data generated by the scanning device and representing a continuous black area can be converted by the print data adaptation apparatus in accordance with the invention in such a manner that said print data can be printed by the thermal printing device operated in the second print mode and that during printing of said print data in accordance with the second print mode a substantially continuous black area is printed and the residual gray tone is largely avoided. This situation is illustrated in detail in the right-hand part of FIG. 2 at a suitably enlarged scale. A plurality of dot-like blackened portions A2 of the printing medium are shown, which are situated at the intersections of the printing row lines R1 to R5 with the printing column lines C1' to C5'. It is apparent that the area of blank portions B2 is almost vanishingly small in comparison with the area of the blank portions B1 and that a subsequently continuous black area is obtained. Furthermore, this has the advantage that substantially the maximum attainable image contrast can be obtained, which provides a substantial improvement of the reproducibility of details of the contents in the case of copying of the contents of a document onto a printing medium.

The invention provides that the first conversion information and the second conversion information can be processed in the simplest possible manner.

The invention provides that the conversion information is directly available in the data conversion means and it is consequently not necessary to apply the conversion information to the data conversion means. Moreover, this has the advantage that the first conversion information and the second conversion information can be processed directly by the data conversion means without the use of data processing means external to the data conversion means.

The invention provides that the correct conversion information for the conversion of the scan data can be selected in accordance with the conversion mode of the data conversion means.

The invention provides that the selection of the first conversion information and the second conversion information is effected inside the data conversion means by the conversion information selection means, which are preferably included in the data conversion means.

The invention provides that production at minimal costs is guaranteed in the case of suitably large quantities.

The invention provides that in the case of a difference between the scanning row feed of the scanning means and the printing row feed of the thermal printing means the scan data can be converted into printing data that can be printed by the thermal printing means in the seconds print mode. Thus, in the case of a scanning row feed equal to 2 times the printing row feed the print data representing one row are supplied 2 times. Accordingly, in the opposite situation said data supply halved, i.e. the print data representing every seconds row are suppressed.

The invention further provides that in the case of dot-by-dot scanning of the document contents by scanning means operated in the second scan mode the document contents can be scanned in the feed direction of the document in such a manner the dots overlap. This has the additional advantage that a higher resolution can be achieved in the feed direction of the document although the scan dot size is maintained. This further yields the advantage that the document contents in the feed direction of the document can be scanned in a coherent manner, as a result of which the scan data thus generated represent the document contents with a high accuracy. This further yields the advantage that in the second mode of the scanning means an adjustment of the scanning row feed to the printing row feed in the seconds print mode of the thermal printing means which can be connected to the scanning device in accordance with the invention, as a result of which the document contents can be scanned with a resolution in the document feed direction equal to the resolution during printing in the second print mode of the thermal printing means.

The invention further provides that during dot-by-dot printing by means of the thermal printer in the second print mode of the thermal printing device in accordance with the invention, while the document is advanced by means of the printing medium feed means, printing can be effected in such a manner that the dots overlap in the feed direction of the printing medium, and that received scan data can be converted into print data by means of print data adaptation means included in the thermal printing device in accordance with the invention, which print data can be printed the thermal printing means set to the second print mode.

The invention will now be described in more detail with reference to the drawings, which show an embodiment given by way of example but to which the invention is not limited.

DETAILED DESCRIPTION

Figure 1:
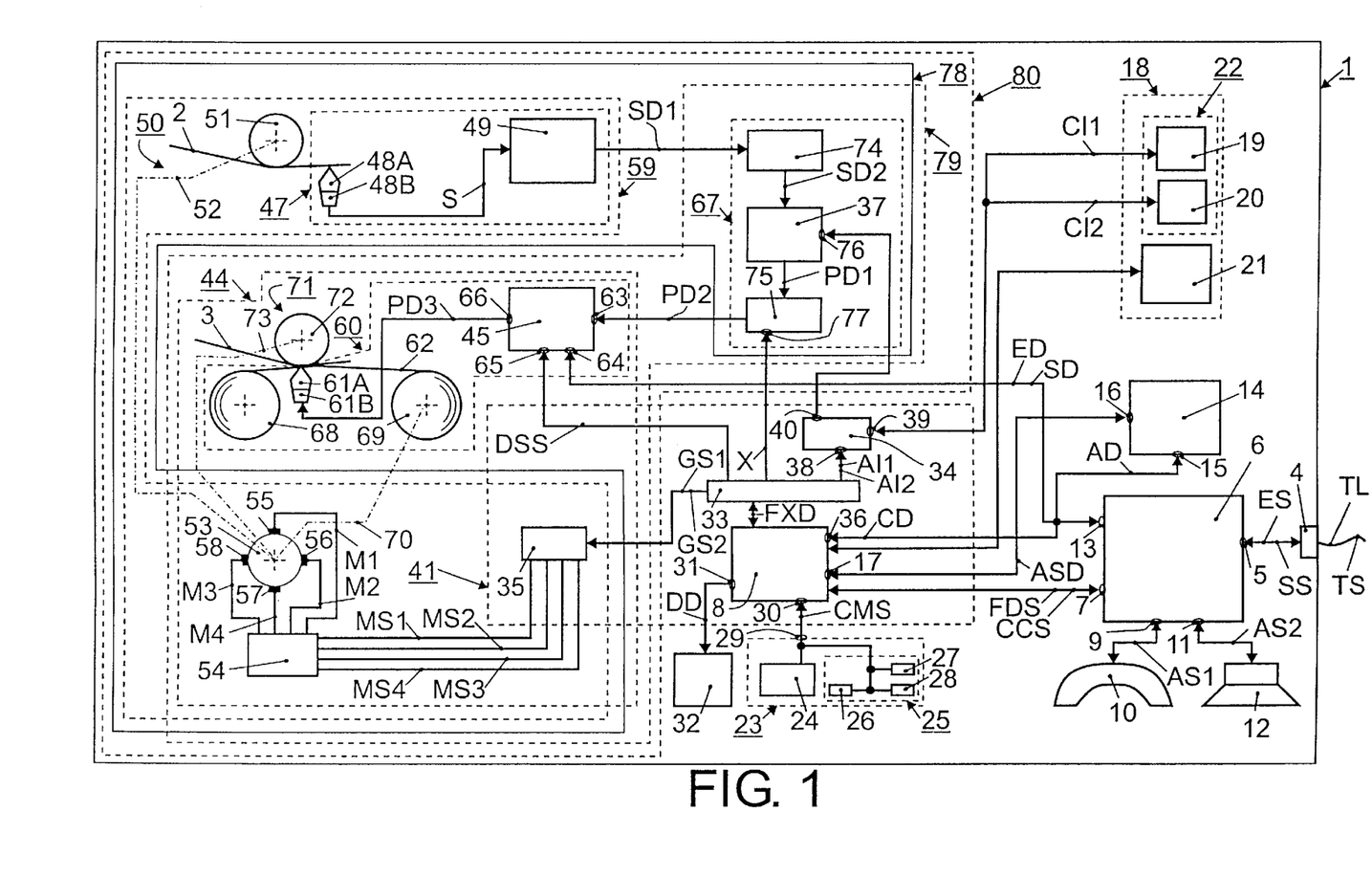
FIG. 1 is a block diagram which diagrammatically shows a relevant part of a facsimile apparatus, namely a facsimile device, the print data adaptation means and a scanning device and a thermal printing device and a copying device.

FIG. 1 shows a facsimile device of 1 of a facsimile apparatus which services to communicate with the communications terminal devices that can be connected to a telephone line TL and to copy contents of a document onto a printing medium 3.

For the purpose of communication the facsimile device 1 has a telephone line terminal 4 to which a telephone line TL can be connected. A line terminal 5 of a communication means 6 is connected to the telephone line terminal 4. The communication means 6 is adapted to receive and to supply telephone line signals TS, which have a telephone line signal level. The telephone line signals TS may be, for example, audio signals, facsimile signals or DTMF coded signals. The communication means 6 is adapted to establish a connection between the facsimile device 1 and the telephone line TL and to interrupt this connection. The communication means 6 is further adapted to identify and to count ringing signals contained in the telephone line signal TS.

The communication means 6 have a control terminal 7 for receiving communication control signals CCS from a communication control means 8 connected to this control terminal 7 and for supplying a facsimile detection signal FDS to the communication control means 8. Furthermore, the communication means 6 enables a ringing number for the connection to be set with the aid of the communication control signals CCS via the control terminal 7, so that a connection can be established after a number of counted ringing signals corresponding to the ringing number.

The communication means 6 has a first audio terminal 9 for receiving first audio signals AS1 that can be generated with the aid of a handset 10 employed by a user and for supplying first audio signals AS1 that can be generated with the aid of the communication means 6 to the handset 10 employed by the user. Whether the handset 10 is busy can be detected with the aid of a busy detector, not shown, and can be signaled by means of a busy signal that can be supplied to the communication control means 6 from the output of the busy detector.

The communication means 6 further has a second audio terminal 11 for supplying second audio signals AS2 to a loudspeaker 12. In the case that the handset 10 is busy the second audio signals AS2 may be formed by the first audio signals AS1 in a hands-free mode, while in the case that no busy condition is detected the second audio signals may be formed by internal ringing signals that can be generated by the communication means 6.

When the communication means 6 have established a connection the communication means 6 is further adapted to provide level adaptation, which makes it possible to adapt a difference in signal level between the line signal level of the telephone line signals TS and a communication means signal level of adapted telephone line signals which occur in the communication means 6 and which can be processed in the communication means 6, by which adapted telephone line signals the first audio signals AS1 as well as the second audio signals AS2 can be formed. When the communication means 6 have established a connection the communication means 6 is adapted to detect facsimile identification signals in the telephone line signals TS and to generate the facsimile detection signal FDS. In the absence of facsimile detection signals in the telephone line signals TS the communication means 6 is adapted to generate the internal ringing signals, which in this case form the second audio signals AS2.

The communication means 6 have a digital connection terminal 13 arranged to receive digital data SD to be transmitted and to supply received digital data ED. The digital connection terminal 13 is further arranged to receive and supply answering machine data AD. The communication means 6 is adapted to provide digital conversion of the adapted telephone line signals and thus generate the received digital data ED. When the digital data SD to be transmitted are present the communication means 6 is adapted to provide analog conversion of the digital data SD to be transmitted, i.e. to generate adapted telephone line signals.

The facsimile device 1 includes a digital answering machine 14 having its data terminal 15 to the digital connection terminal 13 of the communication means 6. The received digital data ED and the digital data SD to be transmitted can be exchanged between the answering machine 14 and the communication means 6 via the data terminal 15 and the digital connection terminal 13. The answering machine 14 further has a control terminal 16 connected to an answering machine control terminal 17 of the communication control means 8. With the aid of this connection answering machine control data ASD can be exchanged between the communication control means 8 and the answering machine 14. This enables the answering machine 14 to be set to a recording mode for the recording of received digital data ED generated with the aid of the communication means 6, which digital data ED then form the answering machine data AD. The answering machine data ASD further enables the answering machine 14 to be set to a reproducing mode for the reproduction of the recorded answering machine data AD as the digital data SD to be transmitted. Furthermore, the answering machine 14 has also answering machine settings such as, for example, a maximum recording time in the recording mode or for recording a personal message text or selecting a preferred message text before recording.

The facsimile device 1 has memory means 18 divided into a first memory section 19 and a second memory section 20 as well as a third memory section 21. The first memory section 19 stores first conversion information CI1. The second memory section 20 stores second conversion information CI2. Thus, the first memory section 19 and the second memory section 20 form conversion information memory means 22, enabling both the first conversion information CI1 and the second conversion information CI2 to be stored. This has the advantage that both the conversion information CI1 and CI2 to be processed in the simplest possible manner. Apart from the answering machine data AD, the third memory section 21 can store user data, such as telephone numbers and corresponding names or menu settings, as well as software routines of an operating system. The first memory section 19, the second memory section 20 and a part of the third memory section 21, which serves for the storage of software routines, take the form of a read-only memory (ROM), while another part of the third memory section 21 takes the form of a variable memory, namely a flash EPROM.

The facsimile device 1 has a keyboard 23, which has a keypad 24 for the entry of a telephone number or for the entry of a code enabling the use of the facsimile device 1 or for the selection of a menu item for programming the facsimile device 1 or for the entry of letters for the storage of names by the user. The keyboard 23 further has control keys 25. The control keys 25 include a connect key, not shown, by means of which the facsimile device 1 can be connected to the telephone line TL and the entered telephone number can be dialed. The control keys 25 further include answering machine keys, not shown, by means of which the answering machine 14 can be set to the recording mode and to the reproducing mode and by means of which the answering machine settings can be carried out. The control keys 25 further include a facsimile start key 26 by means of which a manual reception or transmission of a facsimile message can be started. The control keys 25 further include a normal-contrast copy key 27 and a full-contrast copy key 28, by means of which contents of a document 2 can be copied onto a printing medium 3. Upon actuation of one of the control keys 25 or one of the keys of the keypad 24 by a user the keyboard 23 can generate communication control signals CMS and supply these to a communication control input 30 of the communication control means 8 via an output 29 of the keyboard 23.

In the communication control means 8 the communication control signals CMS can be processed and converted into corresponding display data DD, which can be applied to a display 32 via a display output 31 of the communication control means 8 in order to display the display data DD, so that the user can always verify his entries or choice. Furthermore, the display data DD may also represent current operating modes of the facsimile device 1 which occur in response to the entry, or the choice, or the communication.

Moreover, the communication control means 8 can supply facsimile control data FXD to a facsimile function control means 33, which is adapted to control the facsimile device 1, upon actuation of the facsimile start key 26 or the normal-contrast copy key 27 or the full-contrast copy key 28. Upon actuation of the normal-contrast copy key 27 the facsimile function control means 33 is adapted to supply first selection information AI1 to conversion information selection means 34. Upon actuation of the full-contrast copy key 28 the facsimile function control means 33 is adapted to supply second selection information AI2 to the conversion information selection 34. The facsimile function control means 33 further enables a first generator control signal GS1 to be generated upon actuation of the normal-contrast copy key 27 and a second generator control signal GS2 to be generated upon actuation of the full-contrast copy key 28. The facsimile function control means 33 can supply two generator control signals GS1 and GS2 to a stepping motor control generator 35. Moreover, upon actuation of the facsimile start key 26 or the normal-contrast copy key 27 or the full-contrast copy key 28 the facsimile function control means 33 is adapted to supply print data scaling signal DSS. The facsimile function control means 33 is further adapted to supply output control data X.

The communication control means 8 has a data connection terminal 36 connected to the digital connection terminal 13 of the communication means 6. Received digital data ED forming communication data CD can be received from the telephone line TL by the communication control means 8 at the digital connection terminal 36. The communication control means 8 can further supply digital data SD to be transmitted, which form communication data CD, from the digital connection terminal 36 to the telephone line TL via the communication means 6. The communication data CD may be, for example, digital representations of frequency, as required in a dialing process, which are converted into analog telephone line signals TS by the communication means 8 and are then supplied to the telephone line TL as DTMF coded dial signals in order to dial, via telephone exchanges, a communication device that can be connected to the telephone line TL. However, the communication data CD may alternatively form protocol data which, as customary, are exchanged between two facsimile apparatuses which communicate with one another during the transmission of a facsimile message.

The conversion information selection means 34 are adapted to select the first conversion information CI1 or the second conversion information CI2 for the conversion of scan data into print data with the aid of data conversion means 37. For this purpose, the conversion information selection means 34 have a selection information input 38 and a memory access terminal 39 and a conversion information output 40. The conversion information selection means 34 are adapted to receive the first selection information AI1 and to receive the second selection information AI2 at the selection information input 38.

The conversion information selection means 34 are also adapted to access the conversion information memory means 22. For this purpose, the conversion information selection means 34 have a memory access terminal 39, via which during reception of the first selection information AI1 the first memory section 19 can be accessed and via which during reception of the second selection information AI2 the second memory section 20 can be accessed. During the access to the conversion information selection means 34 either the first conversion information CI1 can be read from the first memory section 19 or the second conversion information CI2 can be read from the second memory section 20. The conversion information output 40 is arranged to supply the first selection information AI1 or the second selection information AI2. The provision of the conversion information selection means has the advantage that it is always possible to select the correct conversion information CI1 or CI2.

The facsimile function control means 33 and the communication control means 8 and the conversion information selection means 34 and the stepping motor control generator 35 form control means 41 of the facsimile device 1. The control means 41 are realized by means of a microprocessor which can perform the software routines. The display 32, the keyboard 23, the handset 10 and the loudspeaker 12 form a user interface of the facsimile device 1.

The facsimile device 1 is adapted to receive reception signals ES and to transmit corresponding print data as well as to transmit transmission signals SS and to copy contents of a document 2 onto a printing medium 3.

The facsimile device 1 includes facsimile receiving means which during reception of a facsimile message are adapted to receive reception signals ES, which represent the contents of a document, via a facsimile transmission channel and to convert the reception signals ES into print data ED that can be printed by thermal printing means 44 and to supply the print data ED to the thermal printing means 44. In the present case, the facsimile transmission channel is formed by the telephone line TL. The reception signals ES are formed by the received telephone signals TS, which can be converted into received digital data ED, i.e. the print data ED, by the subsequent level adaptation, the digital conversion and the output via the digital connection terminal 13 of the communication means 6. The received digital data ED, i.e. the print data ED, can be applied to a print data scaling means 45 included in the thermal printing means 44, which scaling means ensures that said print data ED are transferred as scaled print data PD3, namely to a thermal transfer printer, which will be described in greater detail hereinafter. Thus, the communication means 6 and the telephone line 4 form the facsimile receiving means during reception of the facsimile message.

The facsimile device 1 includes facsimile transmitting means which, during transmission of a facsimile message, are adapted to convert print data PD2, which are printable by the thermal printing means 44, into transmission signals SS and to transmit the transmission signals SS via the facsimile transmission channels. During the conversion print data PD2, which are printable by the thermal printing means 44, can be supplied from the print data scaling means 45 to the digital connection terminal 13 of the communication means 6 as digital data SD to be transmitted, with the aid of which communication means the transmission signals SS are formed by the subsequent analog conversion and level adaptation and the application of the telephone line signals TS to the facsimile transmission channel. Thus, the print data scaling means 45 and the communication means 6 and the telephone line terminal 4 form the facsimile transmitting means during transmission of the facsimile message.

The facsimile device 1 has a scanner 47 which is adapted to perform a dot-by-dot scan of contents of a document 2 and to supply scan data SD1 corresponding to the contents of the document 2 and which is formed by a scanning head 48A with electronic scanning-head means 48B and a scan signal scaling means 49. The scanning head has 1728 optical sensors and a multitude of illumination elements for the illumination of the document 2. Each sensor has a scanning dot size of 0.125 mm, which corresponds to a sensor diameter. The sensors are arranged in rows, thus enabling a dot-by-dot scanning of contents of the document 2 along a row by means of the scanner 47. The contents of the document represent different brightness values along a row and can be converted into scan signals by means of the sensors, which scan signals can be applied to the scan signal scaling means 49 by the electronic scanning head means 48B. In the scan signal scaling means 49 each scan signal SS is subsequently subjected to a level adaptation, then to sampling of its maximum scan signal amplitude, then to a dynamic amplification and, finally, to a quantization with the aid of an 8-bit A/D converter. Thus, 1728 scan data SD1 per row can be generated in the scan signal scaling means 49, the brightness values being quantified in 256 brightness levels.

Figure 3A:
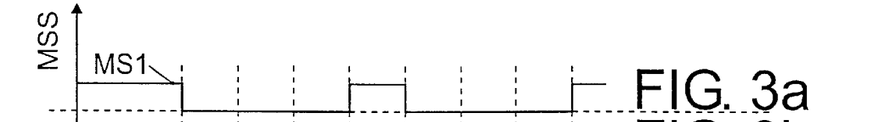
FIG. 3 is a waveform diagram of four motor control signals for controlling a stepping motor included in the facsimile device of FIG. 1 in a full-step mode.
Figure 3B:
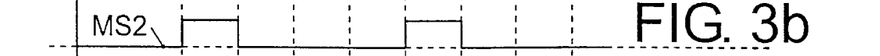
Figure 3C:
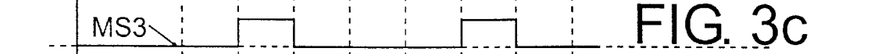
Figure 3D:
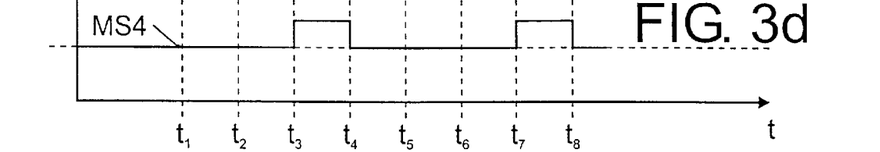

The facsimile device 1 has document feed means 50 for moving the document 2 by a scanning row feed which essentially corresponds to the scanning dot size. For this purpose, the document feed means 50 include a document feed roller 51, a first drive transmission 52, a stepping motor 53, a stepping motor driver 54, and the stepping motor control generator 35. The document feed roller 51 is coupled to the first drive transmission 52, which is formed by a gear-wheel drive. The first drive transmission 52 is coupled to a rotor of the stepping motor 54 and can be driven by means of this motor. The stepping motor 54 has four winding terminals 55, 56, 57 and 58, which can each be driven with a motor current signal M1, M2, M3, M4. The motor current signals M1, M2, M3, M4 are generated by the stepping motor driver 54, namely in correspondence to the motor control signals MS1, MS2, MS3, MS4 that can be applied to the stepping motor driver 54. The motor control signals MS1, MS2, MS3, MS4 can be generated by means of the stepping motor control generator 35. In the present case, the stepping motor control generator 35 is formed by a 4-bit register of the microprocessor in which at consecutive instants $t_2$ to $t_8$ one bit is turned on while the other three bits are turned off, in accordance with the first generator control signal GS1. FIGS. 3a to 3d show the resulting signal waveforms of the motor control signals MS1, MS2, MS3, MS4. FIG. 3a shows the waveform of the first motor control signal MS1, FIG. 3b shows the waveform of the second motor control signal MS2, FIG. 3c shows the waveform of the third motor control signal MS3, and FIG. 3d shows the waveform of the fourth motor control signal MS4. At the instant $t_1$ the rotor remains in an arbitrary rest position. At each of the following instants $t_2$ to $t_8$ a stepwise rotation of the rotor of the stepping motor 53 takes place with a first step width. By means of the first drive transmission 52 the stepwise rotation of the rotor also causes the document feed roller 51 to be rotated stepwise. During the stepwise rotation the document 2, which is in contact with the document feed roller 51, is moved past the sensors of the scanning head 48A in accordance with the scanning row feed.

The scanner 47 and the document feed means 50 form scanning means 59. In a first scan mode of the scanning means 59 the document 2 can be advanced by the scanning row feed which essentially corresponds to the scanning dot size. The scanning means 59 can be set to the first scan mode with the aid of the generator control signal GS1. In the first scan mode the document 2 can thus be scanned in the feed direction of the document 2 with a resolution of 200 dpi.

Figure 4A:
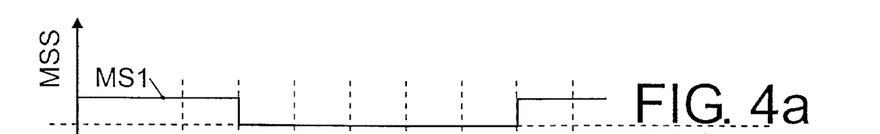
FIG. 4 is a waveform diagram of four motor control signals for controlling a stepping motor included in the facsimile device of FIG. 1 in a half-step mode.
Figure 4B:
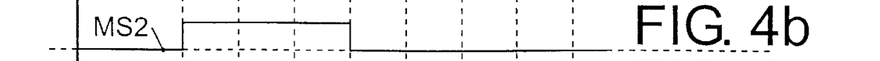
Figure 4C:
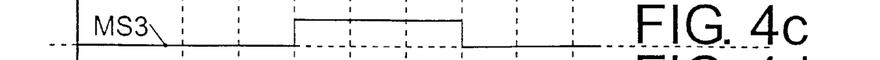
Figure 4D:
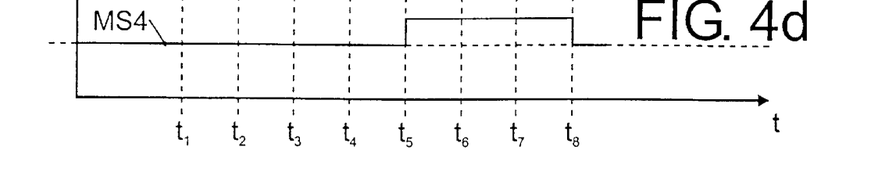

The stepping motor control generator 35 is further adapted to process the second generator control signal GS2, in accordance with which only one bit at a time can be changed while the other three bits in the 4-bit register cannot be changed at consecutive instants $t_2$ to $t_8$. FIGS. 4a to 4d show the resulting waveforms of the motor control signals MS1 to MS4. FIG. 4a shows the waveform of the first motor control signal MS1, FIG. 4b shows the waveform of the second motor control signal MS2, FIG. 4c shows the waveform of the third motor control signal MS3, and FIG. 4c shows the waveform of the fourth motor control signal MS4. At the instant ti the rotor of the stepping motor 53 remains in an arbitrary rest position. At each of the following instants $t_2$ to $t_8$ a stepwise rotation of the rotor of the stepping motor 53 takes place with a second step width, which corresponds to half the first step width. By means of the first drive transmission 52 the stepwise rotation of the rotor of the stepping motor 53 also causes the document feed roller 51 to be rotated stepwise. During the stepwise rotation the document 2, which is in contact with the document feed roller, is moved past the sensors of the scanning head 48A in accordance with half the scanning row feed.

In a second scan mode of the scanning means 59, in which the scanning means 59 can be controlled by means of the second generator control signals GS2, the document 2 can thus be advanced by a scanning row feed which is smaller in comparison with the scanning dot size. In the second scan mode the advantage is obtained that the contents of the document 2 can be scanned in the feed direction of the document in such a manner that the dots overlap. In the present case the document 2 can thus be scanned in the feed direction of the document 2 with a resolution of 400 dpi.

The facsimile device 1 has a thermal printer 60. The thermal printer 60 has a print head 61A with electronic print head means 61B and the print data scaling means 45. In the present case the thermal printer 60 can carry out a thermal printing process in which a thermal transfer foil 62 is employed. The thermal printer 60 can print the print data PD2 in a dot-by-dot fashion with a printing dot size DP shown in FIG. 2. For this purpose, the print head 61A is equipped with 1728 heating elements. Each heating element has a printing dot size of 0.125 mm, which corresponds to a diameter of the heating element. The heating elements are arranged in a row, as a result of which the thermal printer 60 is adapted to print print data PD3 onto a printing medium in a dot-by-dot fashion with a printing dot size DP.

The print data scaling means 45 has a print data input 63 arranged to receive post-processed print data PD2 and has a digital data connection terminal 64 arranged to transfer the received digital data ED or the digital data SD to be transmitted. The print data scaling means 45 further has a scaling input 65 for receiving the print data scaling signal DSS. Depending on the print data scaling signal DSS the print data scaling means 45 can be set to two scaling modes, namely a first scaling mode and a second scaling mode, and to a transfer mode. The print data scaling means 45 has a print data output 66 for the output of the scaled print data PD3. In the two scaling modes the print data scaling means 45 can scale the received post-processed print data PD2 and can generate and supply scaled print data PD3.

When the print data scaling means 45 is in the first scaling mode the reception of post-processed print data PD2 is enabled. Furthermore, it is possible to effect a black-white scaling, as is customary with print data whose contents is formed by text only and as a result of which scaled print data PD3 are formed.

When the print data scaling means 45 is in the second scaling mode the reception of post-processed print data PD2 is also enabled. However, in this case scaling in accordance with a gray scale is possible, as is customary with print data whose contents may include graphics as well as text and which is known to one skilled in the art by the term "dithering" and as a result of which scaled print data PD3 are obtained.

The scaled print data PD3 are available at the print data output 66 both in the first scaling mode and in the second scaling mode of the print data scaling means 45.

In the transfer mode of the print data scaling means 45 it is possible to transfer received digital data ED from the communication means 6 to the electronic print head means 61B, arranged after the print data scaling means 45, the received digital data ED then forming the scaled print data PD3. It is likewise possible to transfer post-processed print data PD2 from the print data adaptation means 67, arranged before the print data scaling means 45, to the communication means 6, the scaled print data PD3 generated by the print data scaling means 45 then forming the digital data SD. During reception of a facsimile message it is thus possible to transfer the received digital data ED from the facsimile receiving means to the electronic print head means 61B. However, a transfer of scaled print data PD3, which are generated with the aid of the print data scaling means 45 and which are printable by the thermal printing means 44, to the facsimile transmitting means is not possible during transmission of a facsimile message.

The electronic print head means 61B of the thermal printer 60 is adapted to receive scaled print data PD3. Said means are further adapted for electrically energizing the heating elements, i.e. for heating the heating elements, in accordance with the scaled print data PD3.

The thermal transfer foil 62 can be unwound from a supply reel 68 and can be wound onto a take-up roller 69 during a printing operation. With the aid of a second drive transmission 70, which is formed by parts of the gear wheel drive, the take-up reel 69 is coupled to the rotor of the stepping motor 53 and can be driven by the stepwise rotation of the rotor. Between the two rollers 68 and 69 the thermal transfer foil 62 has a first side in close contact with the printing medium 3 and a second side in close contact with the print head 61A. During heating of a heating element a heat-activated dye carried in the thermal transfer foil 62 can be transferred to the printing medium 3 in a dot-by-dot fashion, as a result of which a dot-by-dot inking of the printing medium 3 can be achieved.

The facsimile device 1 has printing medium feed means 71 adapted to advance the printing medium 2 with a printing row feed which substantially corresponds to the printing dot size. For this purpose, the printing medium feed means 71 include a printing medium feed roller 72 and a third drive transmission 73, which is formed by a gear wheel drive, as well as the stepping motor 53, the stepping motor driver 54 and the stepping motor control generator 35. The printing medium feed roller 72 is coupled to the third drive transmission 73. The third drive transmission 73 is coupled to the rotor of the stepping motor 53. The stepwise rotation of the rotor causes a stepwise rotation of the printing medium feed roller 72 via the third drive transmission 73. During the stepwise rotation the printing medium 3, which is in contact with the printing medium feed roller 72, is fed past the print head 61A.

In the facsimile device 1 the second drive transmission 70 and the third drive transmission 73 are constructed in such a manner that during reception of the first generator control signal GS1 by the stepping motor control generator 35 the printing medium 3 and the thermal transfer foil 62 are movable with the aid of the stepping motor 53 in synchronism with one another in accordance with the printing dot size DP.

The thermal printer 60 and the printing medium feed means 71 form the thermal printing means 44. In a first print mode of the thermal printing means 44 the printing medium feed means 71 are adapted to advance the printing medium 3 by a printing row feed which substantially corresponds to the printing dot size DP. The thermal printing means 44 can be set to the first print mode with the aid of the first generator signal GS1, in which the result E1 of a printing operation on the printing medium 3 shown in the left-hand part of FIG. 2 can be achieved with the aid of the thermal printing means 44.

When the stepping motor control generator 35 receives the second generator control signal GS2 the printing medium 3 and the thermal transfer foil 62 can be moved with the aid of the stepping motor 53 in synchronism with one another in accordance with half the printing dot size.

In a second print mode of the thermal printing means 44 the printing medium feed means are adapted to advance the printing medium 3 by a printing row feed which is smaller than the printing dot size. The thermal printing means 44 can be set to the second print mode with the aid of the second generator control signal GS2. This has the advantage that the thermal printing means 44 make it possible to print in such a manner that the dots overlap, as is illustrated by the result E2 shown in the right-hand part of FIG. 2.

The print data adaptation means 67 include receiving means 74 and the data conversion means 37, which are arranged after the receiving means 74, as well as output means 75, which are arranged after the data conversion means 37. Both in the first scan mode and in the second scan mode of the scanning means 59 the scan data SD1 can be applied from the scanning means 59 to the receiving means 74. The scan data SD1 are pre-processed in the receiving means 74, after which pre-processed scan data SD2 are available. During pre-processing the scan data SD1 are first corrected, namely as regards the darkest brightness values. To those skilled in the art this correction is known as dark correction. Subsequently, a further correction is applied to the scan data SD1, namely as regards the brightest brightness values. To those skilled in the art this correction is known as shading correction. After this, in the case that the contents of the document represents text, a background correction is applied. To those skilled in the art this correction is known as automatic background control. After the pre-processing the brightness values are quantified in 128 brightness levels. The pre-processed scan data SD2 which can thus be generated can be received by the data conversion means 37.

The data conversion means 37 have a conversion terminal 76 arranged to receive the first conversion information CI1 and the second conversion information CI2, which can be supplied by the conversion information selection means 34. When the first conversion information CI1 is received the data conversion means 37 can be set to a first conversion mode. When the second conversion information CI2 is received the data conversion means 37 can be set to a second conversion mode. In the first conversion mode the data conversion means 37 are adapted to convert the received scan data SD2, in accordance with first conversion information CI1, into print data PD1 printable by the thermal printing means 44 in the first print mode, the printing dot size DP in the first print mode of the thermal printing means 44 substantially corresponding to the printing row feed of the thermal printing means 44. In the second conversion mode the data conversion means 37 are adapted to convert the received scan data SD2, in accordance with the second conversion information CI1, into print data PD1 printable by the thermal printing means 44 in the second print mode, the printing row feed of the thermal printing means 44 in the second print mode of the thermal printing means 44 being smaller than the printing dot size DP.

The print data PD1 thus generated can be applied to the output means 75. The output means 75 enable a post-processing of the print data PD1 to be carried out, during which it is possible to subject the print data PD1 to a noise suppression know to those skilled in the art and an automatic contrast control also known to those skilled in the art. The output means 75 are further adapted to supply the print data PD1 generated by the data conversion means 37 to the print data scaling means 45 as post-processed print data PD2. During this supply the output means 75 are adapted to x times repeat the supply of post-processed print data PD2 which represent each row and which are printable by the thermal printing means 44, if the scanning row feed is x times the printing row feed of the thermal printing means 44.

For this purpose, the said output means 75 have an output control input 77 arranged to receive output control data X, which can be generated by the facsimile function control means 33. With the aid of the output control data X the output means 75 can be set to a first output mode and to a second output mode and to a third output mode. In the first output mode the output means are adapted to supply the print data PD2, which represent each row, one time, the first output mode being intended for the situation in which the scanning row feed is identical to the printing row feed. Thus, in the present case the output means 75 are adapted to repeat the supply of print data PD2 one time.

In the second output mode the output means 75 are adapted to x times repeat the supply of print data PD2, which represent each row, the second output mode being intended for the situation that the scanning row feed is x times as large as the printing row feed. Thus, when for example the scanning row feed is twice as large as the printing row feed, the scanning means 75 are adapted to repeat the supply of print data PD2, which represent each row, two times.

In the third output mode the output means 75 are adapted to reject print data PD2 representing every xth row, the third output mode being intended for the situation that the scanning row feed is x times as small as the printing row feed. Thus, when for example the scanning row feed is two times as small as the printing row feed, the output means 75 are adapted to reject print data PD2 representing every second row, i.e. to 0.5 times repeat the supply of print data PD2 representing each row.

This has the advantage that print data PD2 can be generated which are printable in the second print mode of the thermal printing means 44. This further has the advantage that even in the case of a difference between the scanning row feed and the printing row feed it is possible to generate print data PD2 which are printable by the thermal printing means 44.

After the conversion and the post-processing the brightness values are quantified in 64 brightness levels.

In the facsimile device 1 the print data adaptation means 67 take the form of an integrated circuit, which has the advantage that the print data adaptation means 67 can be manufactured at cheaply.

The scanning means 59 and the print data adaptation means 67 of the facsimile device 1 form a scanning device 78 for generating and supplying the print data PD2 in accordance with the contents of the document 2.

The thermal printing means 44 and the print data adaptation means 67 of the facsimile device 1 form a thermal printing device 79 for printing data PD3 corresponding to the scan data SD1.

The scanning device 78 and the thermal printing device 79 of the facsimile device 1 form a copying device 80 for copying contents of a document 2 onto a printing medium 3.

The operation of the facsimile device 1 shown in FIG. 1 will now be explained with reference to a first example of use, the operation of the copying device 80 of the facsimile device 1 being described in greater detail. In the first example of use it is assumed that the copying device 80 is used for copying the contents of the document 2 onto the printing medium 3 in accordance with a customary normal-contrast copy mode, i.e. in accordance with the prior art.

A user loads an adequate number of unused blank sheets of paper into the magazine, not shown in FIG. 1, of the facsimile device 1. Each of the sheets forms a printing medium 3. Furthermore, the user inserts a printed sheet of paper, whose contents include both text and image content, into a document feeder, not shown in FIG. 1. The printed sheet of paper then forms the document 2. The document 2 is subsequently drawn into a scan start position by first traction means, not shown in FIG. 1, in which scan start position the document 2 is accessible for the scanning head 48A of the scanner 47 and in which scan start position the document 2 is engaged by the scan feed roller 51 and held in this scan start position by this roller.

At the same time, a printing medium 3 is withdrawn from the magazine by second traction means, not shown in FIG. 1, into a print start position, in which print start position the printing medium 3 is accessible for the print head 61A and in which print start position the printing medium 3 is engaged by the print feed roller 72 and is held in this print start position by this roller.

Subsequently, the user selects a photo mode from a function menu via the keypad of the keyboard. The keyboard 23 generates a corresponding communication control signal CMS and supplies this to the communication control means 8. In said means the communication control signal CMS is converted into display data DD, which are applied to the display 32, which consequently displays the words "PHOTO MODE".

Subsequently, the user actuates the normal-contrast copy key 27, as a result of which copying of the contents of the document 2 onto the printing medium 3 is started. The keyboard 23 then generates a corresponding communication control signal CMS and applies this to the communication control means 8. The communication control means 8 generates display data DD and applies these to the display 32. The display 32 then in succession displays the words "PHOTO MODE" and "NORMAL CONTRAST COPY" until copying has ended. The communication control means 8 supply a facsimile control signal FXD in accordance with the activated photo mode and the actuated normnal-contrast copy key 27 to the facsimile function control means 33.

Subsequently, in accordance with the facsimile control data FXD the facsimile function control means 33 supply the print data scaling signal DSS to the print data scaling means 45, which causes the print data scaling means 45 to be set to the second scaling mode. The facsimile function control means 33 supplies the first selection information AI1 to the conversion information selection means 34 in accordance with the facsimile control data FXD.

Upon reception of the first selection information AI1 the conversion information selection means 34 access the first memory section 19. During access the first conversion information CI1 is read from the first memory section 19 via the memory access terminal 39. With the aid of conversion information output 40 said first selection information AI1 is applied to the data conversion means 37 via the conversion terminal 76 of the data converter means 37. Thus, the data conversion means 37 are set to the first conversion mode. Until copying has ended the first conversion information CI1 is buffered in the data conversion means 37 in memory means not shown in FIG. 1.

The facsimile function control means 33 generate the first generator control signal GS1 in accordance with the invention the facsimile control data FXD and apply this signal to the stepping motor control generator 35. The first generator control signal GS1 sets the scanning means 59 to the first scan mode and the thermal printing means 44 to the first print mode. The stepping motor control generator 35 generates the motor control signals MS1, MS2. MS3 and MS4 in accordance with this first generator control signal GS1, which motor control signals have the signal waveforms as shown in FIGS. 3a to 3d. The motor control signals MS1, MS2, MS3 and MS4 are supplied to the winding terminals 55, 56, 57 and 58 of the stepping motor 53 via the stepping motor driver 54 and at the instant $t_2$ shown in FIGS. 3a to 3d they cause a first stepwise rotation of the rotor of the stepping motor 53 with the first step width and, consequently, also a stepwise transport of the document 2 by a scanning row feed which essentially corresponds to the scanning dot size, as well as a stepwise transport of the printing medium 3 by a printing row feed which essentially corresponds to the printing dot size.

During the time interval between the instants $t_2$ and $t_3$ shown in FIGS. 3a to 3d the contents representing one row of the document 2 is scanned in a dot-by-dot fashion. The scan signals 5 generated during scanning by means of the sensors of the scanning head 48A are supplied from the electronic scanning means 48B to the scan signal scaling means 49. The scan signal scaling means 49 generates the scan data SD1 and supplies said data to the print data adaptation means 67, where they are received and pre-processed by the receiving means 74 and are applied to the data conversion means 37 as pre-processed scan data SD2.

In the first conversion mode of the data conversion means 37 the pre-processed scan data SD2, which represent 128 brightness levels, are converted into print data PD1, which represent 64 brightness levels.

The facsimile function control means 33 generate an output control signal X in accordance with the facsimile control data FXD and supply this signal to the output means 75. With the aid of this output control signal X the output means 75 are set to a first output mode, which output mode is maintained until copying has ended.

The print data PD1 are applied to the print data scaling means 45 as post-processed print data PD2 via the output means 75 in the first output mode.

The post-processed print data PD2 are received by the print data scaling means 45 at their print data input 63 and are scaled in accordance with the second scaling mode, which results in scaled print data PD3. The scaled print data PD3 are applied to the electronic print head means 61B of the thermal printer 60 via the print data output 66 of the print data scaling means 45 and are received by said printer, after which the scaled print data PD3, which represent one row of the contents of the document, is printed onto the printing medium 3 in a dot-by-dot fashion in accordance with the printing dot size DP.

At all the further instants $t_n$, where $n \geq 3$, the document 2 is advanced in accordance with the first scan mode of the scanning means 59 and the printing medium 3 is advanced in accordance with the first print mode of the thermal printing means 44, after which during all the subsequent time intervals between the instants $t_n$ and $t_{n+1}$ the scanning device 78 generates print data PD2 which are printable by the thermal printer 60 and are printed by the thermal printer 60.

Copying of the contents of the document 2 by means of the copying device 80 is terminated as soon as the contents of the document 2 has been copied onto the printing medium 3. Subsequently, the document 2 is ejected into a first ejection compartment by ejection means, not shown in FIG. 1, and the printing medium 3 is likewise ejected into a second ejection compartment by second ejection means, neither shown in FIG. 1.

Figure 2:
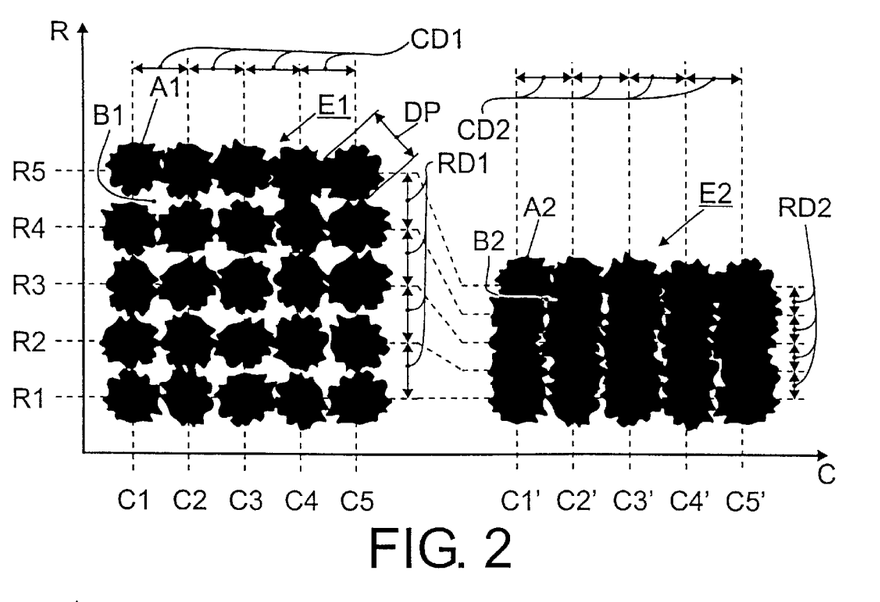
FIG. 2 shows a detail on a suitably enlarged scale of a typical result obtained when a continuous black area is copied by means of the facsimile device shown in FIG. 1.

The left-hand part of FIG. 2 shows to a suitably enlarged scale a part of the printing medium 3 with a typical result E1 as obtained when contents of the document 2 which exhibits a continuous black area is copied onto the printing medium 3. A plurality of dot-like black ink portions A1 are shown, which lie at the intersections of adjacent printing row lines R1 to R5, which are plotted along a vertical axis, with adjacent printing column lines C1 to C5, which are plotted along a horizontal axis. Each printing column line has an equal distance CD1 from its adjacent printing column line along the horizontal axis, the distances CD1 corresponding to the printing dot size. Each printing row line has an equal distance RD1 from its adjacent printing line row, the distances RD1 in the present case also corresponding to the printing dot size DP. Furthermore, a blank portions B1 between the black ink portions A1 are visible. The inevitable blank portions B1 formed during printing with the thermal printing means 44 set to the first print mode lead to a residual gray tone in areas of the printing medium 3 which should be black in accordance with the contents of the document 2.

Figure 5:
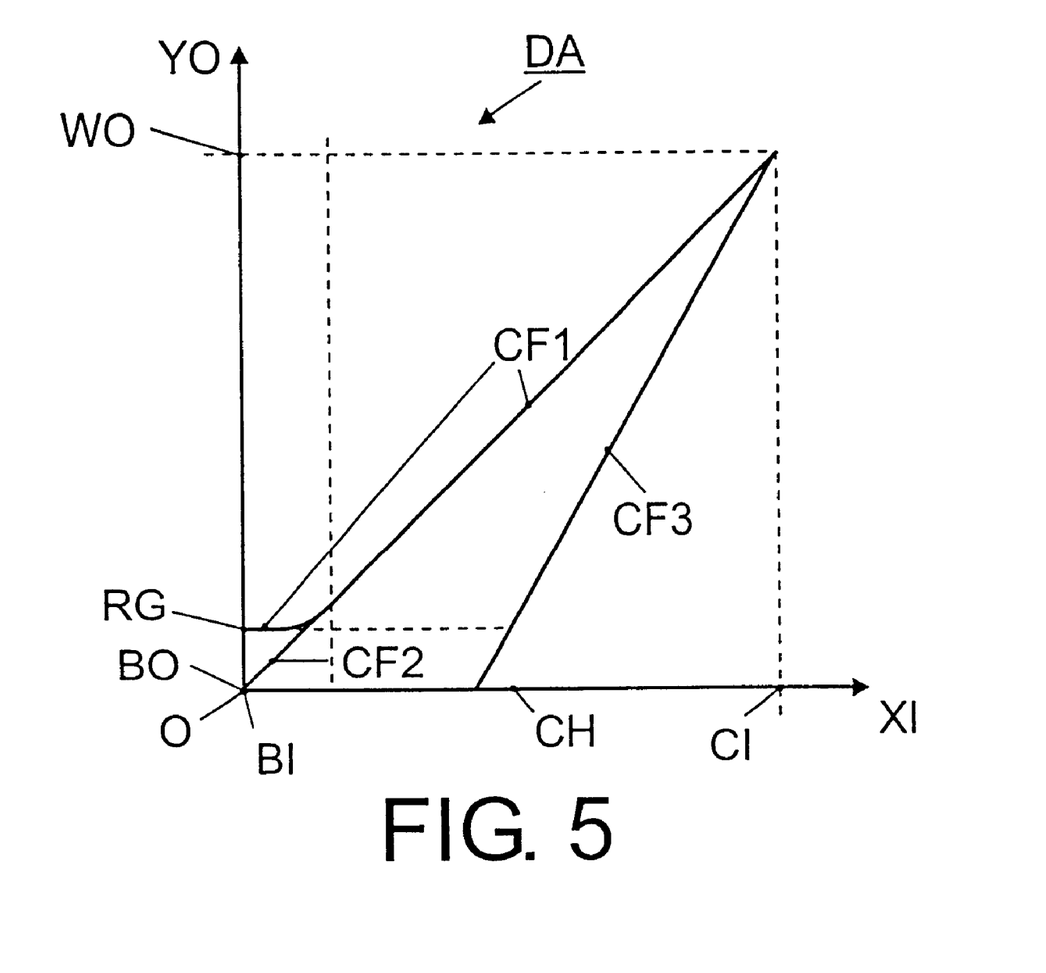
FIG. 5 is a diagram showing a plurality of transfer functions which are possible during copying of the contents of a document onto a printing medium by means of the facsimile device shown in FIG. 1.

This situation may also be clarified with reference to FIG. 5. FIG. 5 shows a first transfer function CF1 for the copying device 80 of the facsimile device 1 described in the first example of use. For this purpose, FIG. 5 shows a diagram DA in which the first transfer function CF1 is plotted, in which diagram DA the brightness values of the document 2 are plotted along the horizontal axis XI, starting with a black color BI at the origin 0 and ending with a color CI representing a maximum brightness and in which the brightness values of the document 2 are plotted along the vertical axis YO, starting with a black color BO at the origin O and ending with a white color WO and with gray tones situated between them. On the basis of what is stated above, as is clearly visible in the diagram DA of FIG. 5, a decrease of the brightness of the document 2 in the area of the black color BI leads to the first transfer function CF1 being leveled off, which for areas of the document 2 which have a black color BI ultimately leads to the residual gray tone RG on the vertical axis YO for the area of the printing medium 3 which should have the black color BO.

The operation of the facsimile device 1 shown in FIG. 1 will be explained hereinafter with reference to a second example of use, for which the operation of the copying device 80 of the facsimile device 1 will be described in greater detail. In the second example of use it is assumed that the copying device 80 is used for copying the contents of a document 2 onto a printing medium 3 in a higher-quality full-contrast copy mode, the thermal printing means 44 of the copying device 80 being set to the second print mode.

By analogy with the first example of use, a user selects the photo mode, while in contradistinction to the first example of use the full-contrast copy key 28 is subsequently actuated. Accordingly, the words "PHOTO MODE" and "FULL CONTRAST COPY" will appear on the display 32 of the facsimile device 1. In the present case, the print data scaling means 45 is also set to the second scaling mode in accordance with the selected photo mode.

However, in accordance with the facsimile control data FXD received in the present case the facsimile function control means 33 supply the second selection information AI2 to the conversion information selection means 34. Thus, the conversion information selection means 34 read the second conversion information CI2 from the second memory section 20 and apply this information to the data conversion means 37, as a result of which the data conversion means 37 are set to the second conversion mode.

On the basis of the facsimile control data FXD the facsimile function control means 33 further generate the second generator control signal GS2 and apply this signal to the stepping motor control generator 35, as a result of which the scanning means 59 are set to the second scan mode and the thermal printing means 44 to the second print mode, and consequently the stepping motor control generator 35 generates the motor control signals MS1, MS2, MS3 and MS4 having the signals waveforms shown in FIGS. 4a to 4d. Thus, a first stepwise rotation of the rotor of the stepping motor 53 with the second step width is activated at the instant $t_2$.

During the time intervals between the instants $t_2$ and $t_3$ shown in FIGS. 4a to 4d the scanning means 59, which are in second scan mode, generate the scan data SD1, which are converted into the print data PD1 by the data conversion means 37 in the second conversion mode and are applied to the thermal printing means 44 as post-processed print data PD2 by the output means 75 in the first output mode with the aid of the output control signal X. Subsequently, the print data PD2 are printed with the aid of the thermal printing means 44, which are in the second print mode.

At all the further instants $t_n$, where $n \geq 3$, the document 2 is advanced in accordance with the second scan mode of the scanning means 59 and the printing medium 3 is advanced in accordance with the second print mode of the thermal printing means 44, after which during all the subsequent time intervals between the instants $t_n$ and $t_{n+1}$ the scanning device 78 generates print data PD3 printable by the thermal printer 60, which print data are printed by the thermal printer 60.

By analogy with the first example of use, the document 2 is ejected and the printing medium 3 is ejected when copying has ended.

The right-hand part of FIG. 2 shows to a suitably enlarged scale a part of the printing medium 3 with a typical result E2 as obtained when contents of the document 2 which exhibits a continuous coherent black area is copied onto the printing medium 3. A plurality of dot-like black ink portions A2 are shown, which lie at the intersections of adjacent printing row lines R1 to R5 with adjacent printing column lines C1' to C5'. Each printing column line has an equal distance CD2 from its adjacent printing column line along the horizontal axis, the distances CD2 corresponding to the printing dot size. Each printing row line has an equal distance RD2 from its adjacent printing line row, the distances RD2 in the present case corresponding to half the printing dot size DP. Furthermore, a blank portions B2 between the black portions are visible.

This has the advantage that the residual gray tone in areas of the printing medium 3 which should be black in accordance with the contents of the document 2 are avoided almost completely when printing is effected with the thermal printing means 44 set to the second print mode, as a result of which a maximal image contrast is obtained.

This situation is also illustrated with reference to a second transfer function CF2 shown in the diagram DA in FIG. 5 for the copying device 80 of the facsimile device 1 described in the second example of use. For all the brightness values of the document 2 which can be distinguished clearly from the black color BI the second transfer function CF2 is identical to the first transfer function CF1. In contradistinction to the first transfer function CF1 the second transfer function CF2 advantageously reaches the origin O of the diagram DA for vanishing brightness values, i.e. in the area of the black color BI on the document 2.

It is pointed out here that the advantageous construction of the data conversion means 37 included in the print data adaptation means 67 for the conversion of the received scan data SD2 in accordance with the second conversion information CI2 is of great importance. If the scan data SD2 were converted in accordance with the first conversion information CI1, this would result in a third transfer function CF3, as is shown in FIG. 5. As is apparent, the third transfer function CF3 only enables a brightness range between the maximum brightness CI and substantially half the maximum brightness CH plotted on the horizontal axis XI to be transferred to the vertical axis YO. This would make it possible to avoid the residual gray tone but it would not be possible to utilize the maximum image contrast.

The operation of the facsimile device 1 shown in FIG. 1 will now be explained hereinafter with reference to a third example of use, for which the operation of the facsimile device 1 during a first process of transmitting a facsimile message will be described in greater detail. In the third example of use it is assumed that the facsimile device 1 is used for the transmission of a facsimile message representing the contents of a document 2 in accordance with the prior art.

During a first transmission process a document 2 is inserted into the facsimile device 1 by a user, in the same way as described in the first example of use, and is then drawn into the facsimile device 1. The user subsequently enters a telephone number to be dialed of a remote facsimile apparatus. To start the transmission of the facsimile message he actuates the facsimile start key 26. After this, the communication control means 8 establishes a connection with the telephone line TL with the aid of the communication means 6. Dial signals in accordance with the entered telephone number are generated in the form of DTMF coded signals and are supplied to the telephone line TL as telephone line signals TS. Subsequently, the communication control means 8 waits until a connection with the remote facsimile apparatus has been established. After this connection has been established, upon detection that a remote facsimile apparatus has been dialed, the communication means 8 supply the facsimile detection signal FDS to the communication control means 8. Subsequently, protocol data are exchanged between the communication control means 6 and the remote facsimile apparatus.

In the third example of use the communication means 8 informs the remote stationary facsimile apparatus, with the aid of the protocol data, that it is equipped with a scanning device 78 for the generation of print data PD2 in accordance with the contents of the document 2, said scanning device 78 having scanning means 59 set to the first scan mode.

In the present example of use the remote facsimile apparatus acknowledges that it is equipped to print print data PD3 onto a printing medium with the aid of thermal printing means having a mode identical to the print mode of the thermal printing means 44 of the facsimile device 1.

After this acknowledgement the data conversion means 37 are set to the first conversion mode. Furthermore, the output means 75 are set to the first output mode, the print data scaling means 45 are set to the transfer mode, and the third drive transmission to the printing medium feed roller 72 as well as the second drive transmission 70 to the supply reel 69 are deactivated. After this, the generation and output of transmission signals S is started.

For this purpose, as already explained in the first example of use, scaled print data PD3 are generated during cooperation of the scanning means 59 with the print data adaptation means 37 and the print data scaling means 45 and are transmitted to the telephone line TL as transmission signals SS with the aid of the facsimile transmitting means. These transmission signals SS are received by the remote facsimile apparatus and are printed with the aid of the thermal printing means.

After termination of the printing process a result is obtained on the printing medium, which is taken from the remote facsimile apparatus, which is substantially identical to the result obtained during copying in accordance with the first example of use, as already known from the prior art.

The operation of the facsimile device 1 shown in FIG. 1 will now be explained hereinafter with reference to a fourth example of use, for which the operation of the facsimile device 1 during a second process of transmitting a facsimile message will be described in greater detail. In the fourth example of use it is assumed that the facsimile device 1 is used for the transmission of a facsimile message, the resolution in the feed direction of the document 2 being higher than the resolution in the feed direction of a printing medium in a remote facsimile apparatus.

In the present case, the facsimile device 1 informs the remote facsimile apparatus, after the connection with this facsimile apparatus has been established, that it is equipped with a scanning device 78 having scanning means 59 set to the first scan mode. In the present example the remote facsimile apparatus acknowledges that it is equipped to print print data PD3 onto a printing medium with the aid of thermal printing means having a mode in which the printing row feed is twice as large as the scanning row feed of the scanning means 79 in the first scan mode. Therefore, only a resolution of 100 dpi in the feed direction of the printing medium is attainable with the printing means of the remote facsimile apparatus.

In the facsimile device 1 the data conversion means 73 are then set to the first conversion mode and the output means 45 are set to the third output mode. After this, the facsimile message is transmitted in the form of transmission signals SS via the telephone line TL.

As a result of the provision of the print data adaptation means 67 in accordance with the invention it is achieved in an advantageous manner that even in the present case print data PD3 are generated which can be printed by the thermal printing means of the remote facsimile apparatus.

The operation of the facsimile device 1 shown in FIG. 1 will now be explained hereinafter with reference to a fifth example of use, for which the operation of the facsimile device 1 during a third process of transmitting a facsimile message will be described in greater detail. In the fifth example of use it is assumed that the facsimile device 1 is used for the transmission of a facsimile message to a remote facsimile apparatus, the thermal printing means in the remote facsimile apparatus in the present case, in contradistinction to the fourth example of use, having a print mode identical to that of the thermal printing means in the device and the resolution in the feed direction of the document 2 in the facsimile device 1 being higher than the resolution in the feed direction of the printing medium in the remote facsimile apparatus.

In the present case, the facsimile device 1 informs the remote facsimile apparatus, after the connection with this facsimile apparatus has been established, that it is equipped with a scanning device 78 having scanning means 59 set to the second scan mode. The remote facsimile apparatus acknowledges that it is equipped with thermal printing means having a print mode identical to the first print mode of the thermal printing means 44 of the facsimile device 1.

In the facsimile device 1 the data conversion means 37 are accordingly set to the first conversion mode and the output means 75 to the third output mode. Subsequently, the facsimile message is transmitted to the remote facsimile apparatus in a known manner.

After termination of printing a result substantially identical to the result obtained during copying in accordance with the first example of use is obtained on the printing medium taken from the remote facsimile apparatus.

In the present case it is advantageously achieved that scan data SD1, which are generated by the scanning means 59 in the second scan mode, are converted into print data PD3 which are printed by the thermal printing means of the remote facsimile apparatus, which printing means are set to a print mode identical to the first print mode.

The operation of the facsimile device 1 shown in FIG. 1 will now be explained hereinafter with reference to a sixth example of use, for which the operation of the facsimile device 1 during a fourth process of transmitting a facsimile message will be described in greater detail. In the sixth example of use it is assumed that the facsimile device 1 is used for the transmission of a facsimile message to a remote facsimile apparatus, the resolution in the feed direction of the document 2 in the facsimile device 1 being smaller than the resolution in the feed direction of the printing medium in the remote facsimile apparatus, in contradistinction to the fifth example of use.

In the present case, the facsimile device informs the remote facsimile apparatus, after the connection with this facsimile apparatus has been established, that it is equipped with a scanning device 78 having scanning means 59 set to the first scan mode. The remote facsimile apparatus acknowledges that it is equipped with thermal printing means having a print mode identical to the second print mode of the thermal printing means 44 of the facsimile device 1.

In the facsimile device 1 the data conversion means 37 are accordingly set to the second conversion mode and the output means 75 to the second output mode. Subsequently, the facsimile message is transmitted to the remote facsimile apparatus in a known manner.

In the present case it is advantageously achieved that scan data SD1 generated by the scanning means 59 in the first scan mode are converted into print data PD3, which are printed by thermal printing means of the remote facsimile apparatus, which are set to a print mode identical to the second print mode.

After termination of printing a result substantially identical to the result obtained during copying in accordance with the second example of use is obtained on the printing medium taken from the remote facsimile apparatus.

The operation of the facsimile device shown in FIG. 1 will now be explained hereinafter with reference to a seventh example of use, for which the operation of the facsimile device 1 during a fifth process of transmitting a facsimile message will be described in greater detail. In the sixth example of use it is assumed that the facsimile device 1 is used for the transmission of a facsimile message to a remote facsimile apparatus in a preferential manner, the contents of the document 2 being scanned in a dotwise overlapping manner in the facsimile device 1 and being printed in a dotwise overlapping manner in the remote facsimile apparatus, in contradistinction to the sixth example of use.

In the present case, the facsimile device 1 informs the remote facsimile apparatus, after the connection with this facsimile apparatus has been established, that it is equipped with a scanning device 78 having scanning means 59 set to the second scan mode. The remote facsimile apparatus acknowledges that it is equipped with thermal printing means having a print mode identical to the second print mode of the thermal printing means 44 of the facsimile device 1.

In the facsimile device 1 the data conversion means 37 are accordingly set to the second conversion mode and the output means 75 to the first output mode. Subsequently, the facsimile message is transmitted to the remote facsimile apparatus in a known manner.

In the present case it is advantageously achieved that scan data SD1 generated by the scanning means in the second scan mode are converted into print data PD3, which are printed by thermal printing means of the remote facsimile apparatus, which are set to a print mode identical to the second print mode.

After termination of printing a result substantially identical to the result obtained during copying in accordance with the second example of use is obtained on the printing medium taken from the remote facsimile apparatus.

The operation of the facsimile device shown in FIG. 1 will now be explained hereinafter with reference to a eighth example of use, for which the operation of the facsimile device 1 during a first process of receiving a facsimile message will be described in greater detail. In the eighth example of use it is assumed that the facsimile device 1 is used for receiving a facsimile message from a remote facsimile apparatus in accordance with the prior art.

In known manner the remote facsimile apparatus then carries out all the steps necessary to generate dial signals and to supply these to the telephone line TL. Once the connection has been established by the communication means 6 of the facsimile device 1 the communication means 6 detect that a remote facsimile apparatus has called.

Subsequently, protocol data are exchanged between the communication control means 8 and the remote facsimile apparatus, the remote facsimile apparatus informing the communication control means 8 that it is equipped with a scanning device having scanning means set to a first scan mode, and that the first scan mode of these scanning means is identical to the first scan mode of the scanning means 59 of the scanning device 78 of the facsimile device 1.

The communication control means 8 supplies appropriate facsimile control data FXD to the facsimile function control means 33. Accordingly, the thermal printing means 74 of the facsimile device 1 is set to the first print mode and the print data scaling means 45 are set to the transfer mode. Furthermore, the first drive transmission 52 is disengaged from the document feed roller 51 with the aid of means, not shown.

Subsequently, the reception signals ES are received with the aid of the facsimile receiving means 43 and are converted into received digital data ED, which represent the scaled print data PD3 and which can be printed by the thermal printing means 44 and are therefore subsequently printed out by the thermal printing means 44.

After termination of printing a result substantially identical to the result obtained during copying in accordance with the first example of use is obtained on the printing medium 3, in a manner as already known in the prior art.

The operation of the facsimile device shown in FIG. 1 will now be explained hereinafter with reference to a ninth example of use, for which the operation of the facsimile device 1 during a second process of receiving a facsimile message will be described in greater detail. In the ninth example of use it is assumed that the facsimile device 1 is used for receiving a facsimile message from a remote facsimile apparatus in a preferential manner, the thermal printing means 44 being set to the second print mode.

As described for the eighth example of use, a connection with the remote facsimile apparatus is then established, upon which during an exchange of protocol data the remote facsimile apparatus informs the facsimile device 1 that it is equipped with a scanning device having scanning means set to a second scan mode, the second san mode of these scanning means being identical to the second scan mode of the scanning means 59 of the scanning device 78 of the facsimile device 1.

Subsequently, the print data scaling means 45 are set to the transfer mode and the thermal printing means 44 are set to the second print mode, after which the facsimile message sent by the remote facsimile apparatus is printed out.

In the present case, it is advantageously achieved that scan data SD1, which have been generated by the scanning means of the remote facsimile apparatus in a scan mode identical to the second scan mode of the scanning means 59, are converted into print data PD3 in the facsimile device 1, which print data are printed by the thermal printing means 44 of the facsimile device 1 which are in the second print mode.

After termination of printing a result substantially identical to the result obtained during copying in accordance with the second example of use is obtained on the printing medium 3.

It is to be noted that, instead of the output means 75, the receiving means 74 or the data conversion means 37 may be adapted to x times repeat the supply of print data which represent each row and which are printable by the thermal printing means 44, in which cases the receiving means 74 supply the post-processed scan data SD2 or the data conversion means 37 supply the print data PD1. As a result of this, these versions of the receiving means 74 and of the data conversion means 37 likewise have the advantages obtained by means of the output means 75 in accordance with the invention.

It is to be noted that it is very advantageous to include the conversion information memory means 22 in the data conversion means 37. As a consequence, the first memory section 19 and the second memory section 20 then form parts of the data conversion means 37, as a result of which the data conversion information CI1 as well as the data conversion information CI2 are directly available in the data conversion means 37.

It is to be noted that it is also very advantageous to include at least a part of the conversion information selection means 34 in the data conversion means 37, which in an advantageous manner enables the relevant conversion information CI1 or CI2 to be selected directly within the data conversion means 37.

It is to be noted that it is also possible to incorporate the scan signal scaling means 49 and the print data scaling means 45 together with the print data adaptation means 67 in one integrated circuit. Furthermore, it is to be noted that such an integrated circuit may also include the microprocessor for realizing the control means and the answering machine 14.

It is to be noted that the communication means 6 perform various functions of a codec device know to one skilled in the art of the facsimile apparatus as described herein and that the communication means 6 also perform various functions of a conventional telephone line interface.

It is to be noted that the first memory section and the second memory section may take the form of a programmable memory.

It is to be noted that the conversion information selection means 34 may also be adapted to write first conversion information CI1 and second conversion information CI2 during access to the conversion information memory means 22, which enables the conversion information to be changed in an advantageous manner.

It is to be noted that the stepping motor control generator 35 may alternatively be formed by a 4-bit shift register, each of the four bits having an output and each output being connected to the stepping motor driver 54.

Furthermore, it is to be noted that the copying device 80 included in the facsimile device 1 may be configured in such a manner that the scanning device 78 has scanning means 59 operated in the first scan mode and that the thermal printing means 44 are at the same time operated in the second print mode. Moreover, it is possible that the scanning means 59 are operated in the second scan mode while at the same time the thermal printing means 44 are operated in the first print mode. These configurations are possible when either the first drive transmission 52 or the second drive transmission is suitably constructed in such a manner that the document 2 can be advanced with a scanning row feed which differs from the printing row feed during the transport of the printing medium 3. This configuration is also possible when scanning of the document 2 is effected at another instant than printing onto the printing medium 3. This can be achieved, for example, in that fourth memory section in the memory means 18 is configured as a copy buffer memory and in that the facsimile function control means 33 have memory access means with the aid of which, for example, the print data PD2 can be buffered in the copy buffer memory in the time between scanning and printing.

Furthermore, the facsimile function control means 33 may be adapted, for example, to supply the first generator control signal GS1 during scanning and to supply the second generator control signal GS2 during printing. These measures also result in the document 2 being advanced with a scanning row feed which differs from the printing row feed during the transport of the printing medium 3. However, as a result of the provision of the print data adaptation means 67 in accordance with the invention it is always assured in an advantageous manner that the scan data SD1 can be converted into print data PD2 printable by the thermal printing means 64 in accordance with suitable conversion information CI1 or CI2.

It is to be noted that in the facsimile device 1 in accordance with the invention the means 49, 67 and 45 form image processing means.

Furthermore, it is to be noted that in the second scaling mode of the print data scaling means 45 a grayscale may be applied which is known to those skilled in the art as "error diffusion".

Furthermore, it is to be noted that during transport of the printing medium 3 with a printing row feed smaller than the printing dot size DP the transport can be effected by 0.1 times to 0,9 times the printing dot size DP. The second conversion information CI2 should be changed accordingly. However, in practice it has proved that a transport by the printing row feed which corresponds to half the printing dot size can be realized in the simplest possible way and that, although a slower printing in comparison with a transport by the printing row feed which corresponds to the printing dot size is to be taken into the bargain, the printing result obtained on the printing medium 3 is essentially without a residual graytone RG. Furthermore, in the case that the scanning row feed is not identical to the printing row feed, it is to be noted that the output means 75 should be adapted to process an output control signal X corresponding to the relevant situation by means of which the output means 75 can be set to the second output mode. In the case that the printing row feed corresponds to 0.1 times the printing dot size DP and the scanning row feed corresponds to 10 times the printing row feed, the output control means 75 should be adapted to 10 times supply the print data PD2 corresponding to each row.

A facsimile apparatus may also have only the full-contrast copy mode described with reference to the facsimile device 1. Instead of two keys for starting the normal-contrast copy mode and the full-contrast copy mode said starting may be effected with the aid of menu functions realized by means of a microprocessor

What is claimed is:

1. Print data adaptation means having receiving means for receiving scan data generated by a scanning means and having data conversion means which in a first conversion mode is adapted to convert the received scan data into printable print data in accordance with first conversion information, which print data can be printed by a thermal printing means set to a first print mode, the thermal printing means having a printing row feed substantially corresponding to a printing dot size when the thermal printing means is in the first print mode, and having output means for supplying the print data generated by the data conversion means to the thermal printing means, wherein the data conversion means can be set to a second conversion mode, and in the second conversion mode the data conversion means is adapted to convert the received scan data into printable print data in accordance with second conversion information, which print data can be printed by the thermal printing means set to a second print mode, the printing row feed of the thermal printing means being smaller than the printing dot size in the second print mode of the thermal printing means, wherein the receiving means are adapted to receive generated scan data, which scan data can be generated by scanning means set to a first scan mode, a scanning row feed of the scanning means corresponding substantially to a scanning dot size in the first scan mode of the scanning means, and, when the scanning row feed of the scanning means is x times the printing row feed of the thermal printing means, the output means are adapted to x times repeat the supply of print data which represent each row and which are printable by the thermal printing means.

2. Print data adaptation means as claimed in claim 1, wherein conversion information memory means have been provided, by which both the first conversion information and the second conversion information can be stored.

3. Print data adaptation means as claimed in claim 2, wherein the conversion information memory means are included in the data conversion means.

4. Print data adaptation as claimed in claim 1, wherein conversion information selection means have been provided, which are adapted to select the first conversion information or the second conversion information for the conversion of the scan data by the data conversion means.

5. Print data adaptation means as claimed in claim 4, wherein at least a part of the conversion information selection means is included in the data conversion means.

6. Print data adaptation means as claimed in claim 5, wherein the print data adaptation means take the form of an integrated Circuit.

7. A scanning device which is adapted to generate and to supply print data corresponding to contents of a document and which included scanning means having a first scan mode and including a scanner adapted to scan the contents of the document in a dot-by-dot fashion in accordance with a scanning dot size and to generate and to supply scan data corresponding to the contents of the document, and including document feed means which, in the first scan mode of the scanning means are adapted to advance the document by a scanning row fee which corresponds substantially to the scanning dot size, wherein the print data adaptation means as claimed in claim 1 have been provided.

8. A scanning device as claimed in claim 7, wherein the scanning means can be set to a second scan mode and the document feed means, in the second scan mode of the scanning means, are adapted to advance the document by a scanning row fee which is smaller in comparison with the scanning dot size.

9. A thermal printing device adapted to receive scan data and to print data which represent said scan data and which include thermal printing means, which have a first print mode and which include a thermal printer adapted to print the print data onto a polarity detection means in a dot-by-dot fashion in accordance with a printing dot size, and which include printing medium feed means adapted to advance the printing medium, in the first print mode of the thermal printing means, by a printing row feed which corresponds substantially to the printing dot size, characterized in that the thermal printing means can be set to a second print mode for printing print data, and the printing medium feed means, in the second print mode of the thermal printing means is adapted to advance the printing medium by a printing row feed which is smaller in comparison with the printing dot size, and print data adaptation means as claimed in claim 1 have been provided.

10. A thermal printing device as claimed in claim 9, wherein print data adaptation means as claimed in claim 1 have been provided.

11. A copying device adapted to copy contents of a document onto a printing medium, wherein a thermal printing device as claimed in claim 9 has been provided.

12. A copying device as claimed in claim 11, wherein a scanning device as claimed in claim 8 has been provided.

13. A copying device as claimed in claim 12 wherein the scanning row feed and the printing row feed substantially correspond to one another when the scanning means are in the second scan mode and the thermal printing means are in the second print mode.

14. A facsimile device which is adapted to receive reception signals and to print data which represent the reception signals and to generate and to supply transmission signals and to copy contents of a document onto a printing medium, and which included facsimile receiving means which are adapted to receive reception signals which represent contents of a document via a facsimile transmission channel and to convert the reception signals into print data printable by thermal printing means and to supply the print data to the thermal printing means, and which included facsimile transmitting means which are adapted to convert print data printable by thermal printing means into transmission signals and to transmit the transmission signals via the facsimile transmission channel, wherein a copying device as claimed in claim 11 has been provided.

15. A facsimile device as claimed in claim 14, wherein a copying device as claimed in claim 12 has been provided.

16. A facsimile device as claimed in claim 15, wherein a copying device as claimed in claim 13 has been provided.

\* \* \* \* \*

UNITED STATES PATENT AND TRADEMARK OFFICE
CERTIFICATE OF CORRECTION

PATENT NO.   : 6,618,169 B2
DATED        : September 9, 2003
INVENTOR(S)  : W. Czadul, M. Loidl and K. Hanisch

It is certified that error appears in the above-identified patent and that said Letters Patent is hereby corrected as shown below:

Column 9,
Line 57, change "ti" to -- $t_1$ --.

Column 14,
Line 39, change "normnal" to -- normal --.

Signed and Sealed this

Thirteenth Day of July, 2004

JON W. DUDAS
*Acting Director of the United States Patent and Trademark Office*